Patented June 20, 1944

2,352,020

UNITED STATES PATENT OFFICE 2,352,020

PROCESS FOR THE PRODUCTION OF ANALGETICALLY ACTIVE TETRAHYDRONAPHTHOLS

Georg Scheuing and Bruno Walach, Ingelheim-on-the-Rhine, Germany; vested in the Alien Property Custodian No Drawing. Application October 19, 1940, Serial No. 361,888. In Germany November 17, 1939

3 Claims. (Cl. 260—293)

It has been found that the 1-hydroxy-2-piperidyl-1,2,3,4-tetrahydronaphthalenes of the general formula:

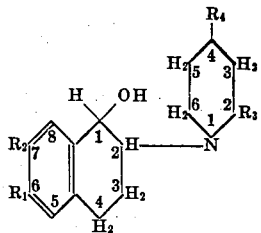

possess a strong analgetic action at a comparatively small toxicity.

In the foregoing general formula $R_1$ and $R_2$ means hydrogen atoms, hydroxy, alkyloxy or alkyl groups and $R_3$ and $R_4$ hydrogen atoms or alkyl groups.

The production of the compounds according to the invention is carried out by known methods, in that the corresponding 1-oxo compounds are reduced for instance by catalytic hydrogenation or reduction by aluminium amalgam, etc. The 1-oxo compounds used as the starting material can be obtained for instance by the process according to the U. S. A. patent (application Serial Number 309,702) by reacting the 1-oxo-2-halogentetrahydronaphthalenes with piperidines in the presence of organic solvents with the exception of anhydrous methyl alcohol.

As especially good analgetics were found the 6-methoxy-1-hydroxy-2-N-piperidyl- 1,2,3,4- tetrahydronaphthalene with a M. P. of 110° C. (M. P. of the hydrochloride 206° C.) and the 6-methoxy-1-hydroxy-2-N(2,4 - dimethylpiperidyl) - 1,2,3,4 - tetrahydronaphthalene (M .P. of the hydrochloride 183° C.) as well as the corresponding ethoxy and butoxy compounds.

Strauss has described (see Berichte der deutschen chemischen Gesellschaft vol. 54 (1921) p. 40 and following, especially pp. 59 and 62) a compound, which he has formulated as the 1-oxy-2-piperidyl - 1,2,3,4 - tetrahydronaphthalene. Von Braun supposes (see the same paper vol. 55 (1921) p. 3648 and following especially p. 3655) its constitution to be that of the 1-hydroxy-2-piperidyl - 1,2,3,4 - tetrahydronaphthalene. But the known compound is the 1-piperidyl-2-oxy-tetrahydronaphthalene, this following from the fact that by the catalytic hydrogenation of the 1-oxo-2-piperidyltetrahydronaphthalene an hydroxy compound results, which is different from the known compound. However the constitution of the compound obtained by the catalytic hydrogenation of the 1-oxo-2-piperidyltetrahydronaphthalene is verified by the process of its preparation, especially in accordance with researches concerning the production of the synthetic adrenaline and ephedrine.

In the following the process according to the invention may be explained by means of some examples, no limitation as to the starting materials, the proportions of their quantities, the temperatures etc. stated in these examples, being intended.

EXAMPLE 1.—*6-methoxy-1-hydroxy-2-N-piperidyl-1,2,3,4-tetrahydronaphthalene*

80 g. of the hydrochloride of the 6-methoxy-1-oxo-2-piperidyl - 1,2,3,4 - tetrahydronaphthalene with a M. P. of 203° C. dissolved in 500 cc. of methyl alcohol are hydrogenated with 30 g. of a nickel catalyst under a hydrogen pressure of 200 atm. at 110–120° C. The hydrogen addition stops as soon as about 1 mol of hydrogen is taken up. From the resulting solution one obtains 60 g. of the base with a B. P. of 177° C. at 0.3 mm. Hg in a yield of 86% of the theory. When crystallised out of petrol it melts at 110°C. The hydrochloride has a M. P. of 206° C.; beside this 6 g. of an isomeric compound (M. P. of the hydrochloride 196° C.) in a yield of 8.5% of the theory are to be obtained.

EXAMPLE 2.—*1-hydroxy-2-N-piperidyl - 1,2,3,4 - tetrahydronaphthalene*

25 g. of the 1-oxo-2-piperidyl-1,2,3,4-tetrahydronaphthalenic base with a B. P. of 183° C. at 0.3 mm. Hg (M. P. of the hydrochloride 203° C.) dissolved in 500 cc. of methyl alcohol are hydrogenated with 30 g. of a nickel catalyst at 100–120° C. under a hydrogen pressure of 200 atm. until the hydrogen absorption stops. 20 g. of the base with a B. P. of 189° C. at 0.1 mm. Hg in a yield of 80% of the theory are obtained. The hydrochloride has a M. P. of 200° C.

EXAMPLE 3.—*6-methoxy-1-hydroxy-2-N-α-pipecolyl-1,2,3,4-tetrahydronaphthalene*

32.6 g. of the hydrochloride of the 6-methoxy-1-oxo-2-α-pipecolyl-1,2,3,4 - tetrahydronaphthalene with a M. P. of 192° C. dissolved in 500 cc. of alcohol are hydrogenated with 20 g. of a nickel catalyst as above-mentioned. 20.6 g. of the aminoalcohol with a B. P. of 172° C. at 0.1 mm. Hg in a yield of 72% of the theory are obtained. The hydrochloride has a M. P. of 198° C.

EXAMPLE 4.—*6-methoxy-1-hydroxy-2-N(2,4-dimethylpiperidyl)-1,2,3,4-tetrahydronaphthalene*

25 g. of the hydrochloride of the 6-methoxy-1-oxo-2(2,4-dimethylpiperidyl) - 1,2,3,4-tetrahydronaphthalene with a M. P. of 203° C. dissolved in 80 cc. of alcohol are hydrogenated with 10 g. of a nickel catalyst at 120–130° C. under a hydrogen pressure of 400 atm. until 1 mol of hydrogen is taken up. Hereby 17.5 g. of the aminoalcohol with a B. P. of 206° C. at 0.4 mm. Hg in a yield of 79% of the theory are obtained. The hydrochloride has a M. P. of 183° C.

EXAMPLE 5.—*7-methoxy-1-hydroxy-2(N-tetrahydroisochinolyl)-1,2,3,4-tetrahydronaphthalene*

23.5 g. of the hydrochloride of the 7-methoxy-1-oxo-2(N-tetrahydroisochinolyl)-1,2,3,4-tetrahydronaphthalene with a M. P. of 195° C. dissolved in 85 cc. of alcohol are hydrogenated with 20 g. of a nickel catalyst at 110° C. under a hydrogen pressure of 300 atm. 20.2 g. of the hydrochloride of the aminoalcohol with a M. P. of 214° C. in a yield of 86% of the theory are obtained.

EXAMPLE 6.—*6-methoxy-1-hydroxy-2-N(6-methoxy-1-methyl-1,2,3,4-tetrahydroisochinolyl)-1,2,3,4-tetrahydronaphthalene*

23.7 g. of the hydrochloride of the 6-methoxy-1-oxo-2-N(6-methoxy-1-methyl-1,2,3,4-tetrahydroisochinolyl)-1,2,3,4-tetrahydronaphthalene with a M. P. of 191° C. (M. P. of the base 130° C.) dissolved in 60 cc. of alcohol are hydrogenated with 0.7 g. of platinum oxide at 95–100° C. under a hydrogen pressure of 110 atm. 19 g. of the aminoalcohol with a M. P. of 110° C. in a yield of 88% of the theory are obtained. The hydrochloride has a M. P. of 208° C.

We claim:

1. As a new analgetically active substance the 6-methoxy-1-hydroxy-2-N(2,4-dimethylpiperidyl)-1,2,3,4-tetrahydronaphthalene with a M. P. of the hydrochloride of 183° C. obtained by the catalytic hydrogenation of 6-methoxy-1-oxo-2(2,4-dimethyl-piperidyl)-1,2,3,4-tetrahydronaphthalene.

2. Process for the production of analgetically active 1-hydroxy-2-piperidyltetrahydronaphthalenes consisting in the reduction of the 1-oxo-2-piperidyl-1,2,3,4-tetrahydronaphthalene of the general formula

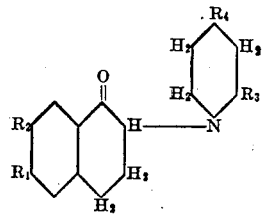

in which $R_1$ and $R_2$ represent radicals taken from the class consisting of hydrogen atoms, hydroxy, alkyloxy and alkyl groups and $R_3$ and $R_4$ represent radicals taken from the class consisting of hydrogen atoms and alkyl groups, to the corresponding 1-hydroxy compounds.

3. As new analgetically active substances the 6-methoxy-1-hydroxy-2-N-piperidyltetrahydronaphthalenes of the general formula:

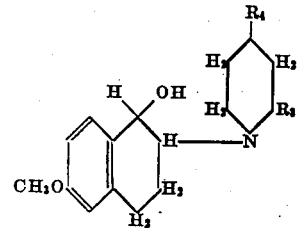

in which $R_3$ and $R_4$ represent radicals taken from the class consisting of H and $CH_3$ groups obtained by the catalytic hydrogenation of the corresponding oxo-compound of the following general formula:

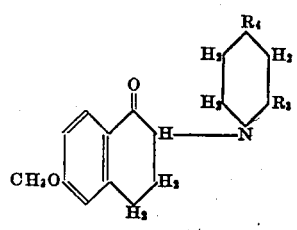

GEORG SCHEUING.
BRUNO WALACH.